Jan. 21, 1936.  A. HERMANNI  2,028,604
ELECTRIC HEATER
Filed July 13, 1935  2 Sheets-Sheet 1
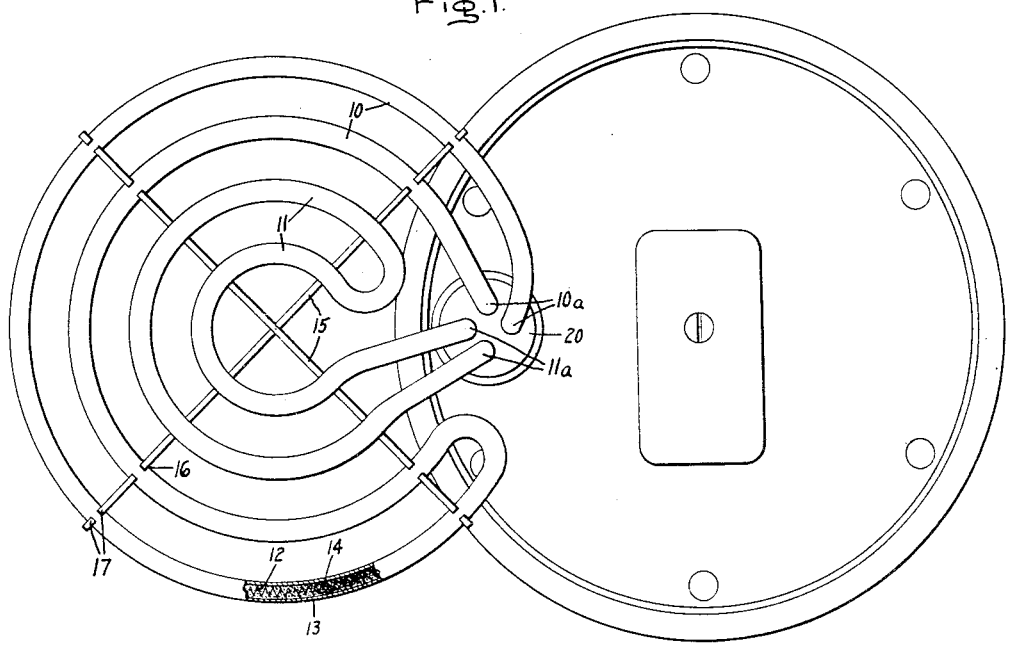
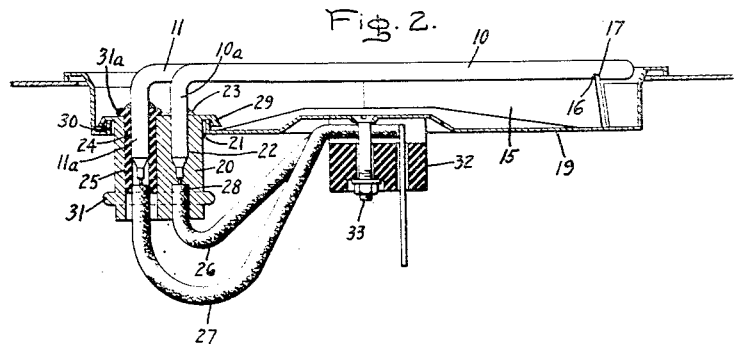
Inventor:
Alfred Hermanni,
by Harry E. Dunham
His Attorney.

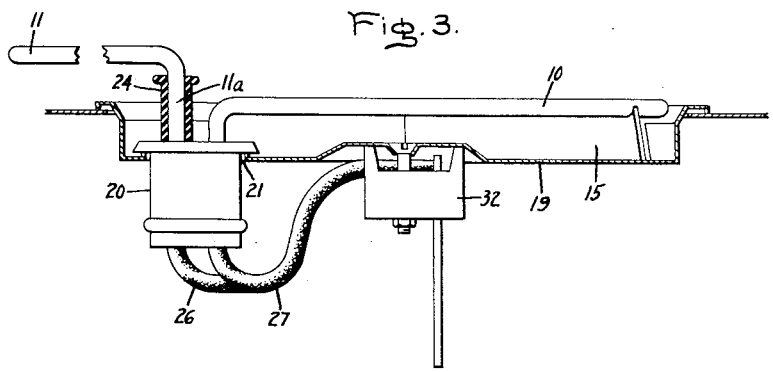
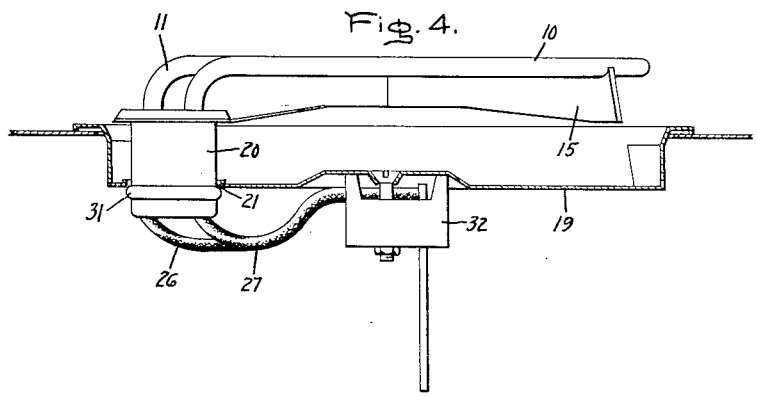
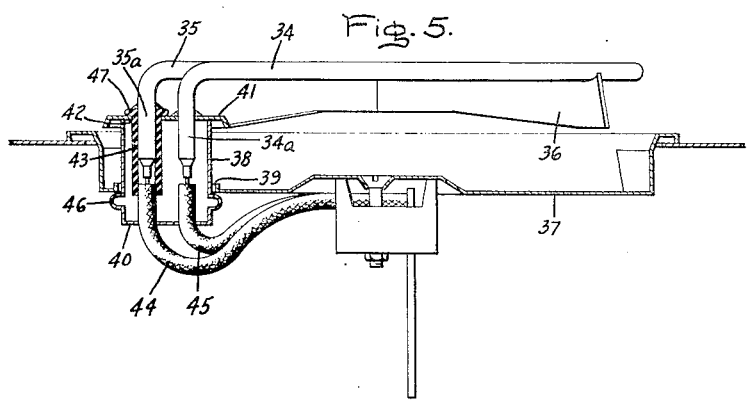

Patented Jan. 21, 1936

2,028,604

UNITED STATES PATENT OFFICE 2,028,604

ELECTRIC HEATER

Alfred Hermanni, Berlin-Frohnau, Germany, assignor to General Electric Company, a corporation of New York Application July 13, 1935, Serial No. 31,223
In Germany October 8, 1934

5 Claims. (Cl. 219—37)

This invention relates to electric heaters, more particularly to electrically heated hot-plates, and it has for its object the provision of an improved heating device of this character.

It is frequently very difficult, and in certain cases impossible, to properly clean certain of the heating plates which are now used in electric chafing-dishes, kitchen ranges, and like electric heating devices. Spilled food particles and other foreign substances collect in certain inaccessible parts of the electrical heating elements and their containers, and not only soil them, but also impair them by weakening their insulation, or by corroding them.

It has already been proposed to arrange the heating unit within its container so that the unit can be elevated from the container and rotated relative to the container so as to uncover substantially the entire bottom wall of the container, whereby the container and unit can be cleansed. Such a heating plate is described and claimed in U. S. patent to R. Causse No. 1,998,308, dated April 16, 1935. This plate is satisfactory on the whole, but it has been found that it is still rather difficult to remove traces of grease and liquid which collect in parts of the heating plate where it is difficult to gain access.

In accordance with this invention, the heating unit is arranged in sections which provide different heated zones, one preferably arranged within the other. That is, in one specific case, there are two heating elements arranged to provide a pair of concentric heated zones. The heating elements are received in a relatively shallow pan or receptacle and are supported on the bottom wall of the receptacle by means of a grid. The grid is secured to one of the heating elements, and this heating element in turn is secured to a pivotal connector member which functions to connect the heating element and grid to the receptacle. The connector member is so arranged that the grid together with both heating elements can be elevated from the receptacle and then swung relative to the receptacle so as to expose the walls of the receptacle for the purpose of cleaning and the like. One of the heating elements, however, is provided with a separate connector member which functions to pivotally connect it with the first connector member, whereby this heating element can be elevated independently of the other heating element and grid to expose portions of the grid and hot-plate.

For a more complete understanding of this invention, reference should be had to the accompanying drawings in which Fig. 1 is a plan view of an electric hot-plate embodying this invention and illustrating the heating elements removed from their receptacle and swung to one side so as to expose the inner walls of the receptacle; Fig. 2 is a vertical central sectional view of the electric hot-plate of Fig. 1, but illustrating the heating element in operative position within the receptacle; Fig. 3 is a view similar to Fig. 2, but illustrating one of the elements elevated and swung out of the receptacle; Fig. 4 is a view similar to Fig. 2, but illustrating both heating elements and their supporting grid elevated from the receptacle; and Fig. 5 is a view similar to Fig. 4, but illustrating connection means between the heating elements and the receptacle of modified form.

Referring more particularly to Figs. 1–4, inclusive, this invention is shown as applied to an electric hot-plate provided with a heating unit having two heating elements 10 and 11. These elements preferably will be of the sheathed type, such as described and claimed in the United States patent to C. C. Abbott No. 1,367,341, dated February 1, 1921. Briefly, these elements comprise a helical element 12 encased in a cylindrical metallic sheath 13. The heating element 12 is embedded in and supported in spaced relation with respect to the sheath by means of a suitable compacted, heat conducting, electrically insulating material 14, such as magnesium oxide.

As shown in Fig. 1, the heating element 10 is formed into a substantially circular convolution which embraces the heating element 11 having a similar form. The terminals 10a and 11a respectively of the two heating elements are located relatively close to each other adjacent the outer periphery of the heating element 10, as clearly shown in Figs. 1–4. It will be observed that by reason of this arrangement the two heating elements provide two concentric heating zones which can be utilized separately or simultaneously by controlling the energization of the heating elements in a manner well understood by those skilled in the art.

The two heating elements 10 and 11 are mounted upon a grid support 15 made of any suitable material, such as steel, or cast iron. The outer heating element 10 is rigidly secured to the framework 15 in any suitable manner, but preferably will be positioned in recesses 16 provided for it in the upper edges of the grid, and secured to the grid by means of jaws or arms 17 formed of the material of the grid on each side of the recesses and arranged to grip the opposite sides of the heating element. The foregoing construction unites the heating element 10 and the grid 15 into a rigid unitary structure. The heating element 11 merely rests upon the grid 15 and is not secured thereto, as is the heating element 10.

The grid 15 rests upon the bottom wall of a relatively shallow dish or pan-like metallic receptacle 19. As shown, in Fig. 2, the framework 15 supports the heating elements 10 and 11 in an elevated position so that the upper surfaces of the heating elements project somewhat above the side walls of the receptacle, whereby articles placed upon the hot-plate rest directly upon the heating elements out of contact with the side walls. Preferably, the heating elements 10 and 11 will be arranged so that when they are supported on their framework 15, as shown in Fig. 2, they will cover an area substantially coextensive with the entire area of the bottom wall of the receptacle.

The terminals 10a and 11a of the two heating elements respectively are turned downwardly as shown in Fig. 2, and are received in a cylindrical connector member 20. This connector member, as shown, is positioned adjacent the outer edge of the heating unit and is received in an aperture 21 provided for it in the bottom wall of the receptacle 19 adjacent the periphery of the bottom wall, as clearly shown in the drawing.

The connector member 20 functions to mechanically connect the heating elements to the receptacle 19 so that the heating elements can be elevated from the receptacle to a plane above it and substantially parallel with the bottom wall of the receptacle, as shown in Fig. 4, and further, so that the elements can be rotated in this plane from the position shown in Fig. 4 to the position shown in Fig. 1 so as to expose substantially all of the inner surfaces of the pan. For this purpose, the terminals 10a of the heating element 10 are rigidly secured to the connector member 20. The connector member of the form of the invention shown in Figs. 1–4 is preferably a solid cylindrical member within which passageways 22 are provided for receiving the two down-turned terminal ends 10a of the heating element 10. The metallic sheath of the heating element 10 is rigidly secured to the connector member in any suitable manner, as by means of welded joints 23. This rigid connection with the terminal ends 10a of the element 10 serves rigidly to unite the connector member with the heating element.

The down-turned ends 11a of the heating element 11 are also received in the connector member 20, but through the medium of a second connector member 24 which itself is received in the connector member 20. As shown, the terminal ends 11a of the element 11 are rigidly secured to the connector member 24 which is of cylindrical form. This member is slidably received in a passageway 25 provided for it in the first connector 20. The heating element 11, therefore, can be moved out of the receptacle 19 independently of the heating element 10 and the supporting grid 15 and can be swung to a position shown in Fig. 3, which uncovers the grid 15 and a portion of the pan to facilitate cleaning of the grid and to facilitate cleaning of both of the heating elements.

Electrical supply conductors 26 and 27 for the heating elements 10 and 11 are directed up into the connector member 20 from the bottom of the pan. As shown, the conductor 26 is directed through a passageway 28 provided for it in the bottom of the cylindrical connector member 20 for connection with the terminals of the heater 10, while the conductor member 27 is directed up into the connector 20 through the passageway 25 for connection with the terminals of the heater 11; as shown, the conductor 27 extends into the second connector member 24 for connection with the terminals of the heater 11.

As shown, the connector member 20 is provided at the top with an outwardly extending flange 29 which engages the bottom of the pan 19 to limit the lower position of the connector and terminals. Preferably, the bottom 19 will be provided with an upright wall 30 surrounding the opening 21 and engaging the flange. The connector member 20 is provided adjacent its lower end with an outwardly extending flange or collar 31 which limits the upper position of the connector, as shown in Fig. 4. The auxiliary connector 24 is provided with a collar 31a at its upper end to limit the lower position of this connector in the member 20.

The supply conductors 26 and 27 terminate in a terminal plate 32 which is fastened, as shown, to the bottom of the pan 19 by means of a screw 33.

It will be observed that the vertical axis of the connector member 20 is eccentrically arranged with reference to the central vertical axis of the receptacle 19 so that when the heating elements are moved upwardly on the pan to the position shown in Fig. 4, they may be rotated on the connector member to the position shown in Fig. 1 so as to uncover the bottom of the pan. If desired, the heating element 11 may be elevated independently of the element 10 and the grid 15 and moved to its position shown in Fig. 3 to uncover the grid and a portion of the pan, as has been previously described. It will be observed that the electrical conductors 26 and 27 have such a length that they can follow the motions of the connectors 20 and 24 upwardly from the pan.

In Fig. 5, a modified form of pivotal connection means between the heating elements and the receptacle is provided. As there shown, two heating elements 34 and 35, similar to the two heating elements 10 and 11, are supported upon a grid 36. The grid and heating elements are provided with a receptacle 37 similar to the receptacle 19. The terminals 34a of the heating element 34 are received in a hollow cylindrical connector member 38 which is received in an aperture 39 provided for it in the bottom of the pan 37. The hollow connector 38 is closed at the bottom by means of a cover 40, preferably formed integrally with the side walls of the connector, and at the top by means of a cover 41. The top cover 41 is provided with an aperture 42 which receives a second connector member 43 rigidly secured to the terminals 35a of the heating element 35. The heating element 34 is rigidly secured to the top 41 as by welding. Supply conductors 44 and 45 enter the connector 38 at the bottom for connection with the heater terminals.

In this form of the invention, the cover 41 limits the downward position of the connector 38, while its upward position is limited by means of a head 46 provided in the side walls of the connector. The lower position of the connector 43 is limited by means of a collar or flange 47 provided at the upper end of the connector.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. An electric hot-plate comprising a receptacle, a plurality of heating elements in said receptacle, a pivotal connecting member mechanically connecting one of said heating elements to said receptacle providing for limited movement of said heating element out of said receptacle and for rotation of said element relative to said receptacle and a member pivotally connecting another of said heating elements to said connecting member providing for movement of said other heating element out of said receptacle and for rotation thereof relative to said receptacle independently of said one heating element.

2. An electric hot-plate comprising a relatively flat receptacle having a bottom wall and side walls extending upwardly therefrom, a pair of heating elements in said receptacles providing different heating zones, a cylindrical connector member secured to one of said heating elements and received in an aperture provided for it in the bottom wall of said receptacle eccentrically positioned with respect to the central vertical axis of said receptacle, said connector providing for vertical movement of said one heating element out of said receptacle to a plane above the side walls of said receptacle and substantially parallel with its bottom wall and for rotary movement of said heating element in said plane uncovering substantially all of said bottom wall, and a second cylindrical connector secured to the other of said heating elements received in an aperture provided for it in said first connector member and providing for vertical movement of said other heating element out of said receptacle independently of said one heating element to a plane above the side walls of said receptacle and substantially parallel with its bottom wall.

3. An electric hot-plate comprising a receptacle, a heating element in said receptacle, a second heating element in said receptacle, a grid supporting said heating elements, means rigidly securing said first heating element to said grid, a cylindrical connector member secured to said first heating element and received in an aperture provided for it in the bottom wall of said receptacle eccentrically positioned with respect to the central vertical axis of said receptacle, said connector providing for vertical movement of said heating elements out of said receptacle to a plane above the side walls of said receptacle and substantially parallel with its botom wall and for rotary movement of said heating elements in said plane uncovering substantially all of said bottom wall, a second cylindrical connector secured to said second of said heating elements received in an aperture provided for it in said first connector member and providing for vertical movement of said second heating element out of said receptacle independently of said first heating element and said grid to a plane above the side walls of said receptacle and substantially parallel with its bottom wall and for rotary movement in said plane.

4. An electric hot-plate comprising a relatively flat receptacle having a bottom wall and side walls extending upwardly therefrom, a heating element in said receptacle, a second heating element in said receptacle, a solid cylindrical connector member having a passageway therethrough secured to said first heating element and received in an aperture provided for it in the bottom wall of said receptacle eccentrically positioned with respect to the central vertical axis of said receptacle, said connector providing for vertical movement of said heating element out of said receptacle to a plane above the side walls of said receptacle and substantially parallel with its bottom wall and for rotary movement of said heating elements in said plane uncovering substantially all of said bottom wall, and a second cylindrical connector secured to said second of said heating elements received in said passageway in said first connector member and providing for vertical movement of said second heating element out of said receptacle independently of said first heating element and grid to a plane above the side walls of said receptacle and substantially parallel with its bottom wall, and for rotary movement in said plane.

5. An electric hot-plate comprising a relatively flat receptacle having a bottom wall and side walls extending upwardly therefrom, a heating element in said receptacle, a second heating element in said receptacle, a hollow cylindrical connector member secured to said first heating element and received in an aperture provided for it in the bottom wall of said receptacle eccentrically positioned with respect to the central vertical axis of said receptacle, said connector providing for vertical movement of said first heating element out of said receptacle to a plane above the side walls of said receptacle and substantially parallel with its bottom wall and for rotary movement of said heating elements in said plane uncovering substantially all of said bottom wall, and a second cylindrical connector secured to said second heating element received in an aperture provided for it in said first connector member and providing for vertical movement of said second heating element out of said receptacle independently of said first heating element and said grid to a plane above the side walls of said receptacle and substantially parallel with its bottom wall, and for rotary movement in said plane.

ALFRED HERMANNI.

CERTIFICATE OF CORRECTION.

Patent No. 2,028,604. January 21, 1936.

ALFRED HERMANNI.

It is hereby certified that error appears in the printed specification of the above numbered patent requiring correction as follows: Page 3, second column, line 21, claim 4, for "element" read elements; and that the said Letters Patent should be read with this correction therein that the same may conform to the record of the case in the Patent Office.

Signed and sealed this 18th day of February, A. D. 1936.

(Seal)

Leslie Frazer
Acting Commissioner of Patents.